United States Patent

Itakura et al.

Patent Number: 5,086,212
Date of Patent: Feb. 4, 1992

[54] TEMPERATURE CONTROLLER HAVING A CONTROLLER BREAKAGE DETECTOR

[75] Inventors: Haruo Itakura; Susumu Kurihara, both of Tokyo, Japan

[73] Assignee: Konica Corporation, Tokyo, Japan

[21] Appl. No.: 545,840

[22] Filed: Jun. 29, 1990

[30] Foreign Application Priority Data

Jul. 10, 1989 [JP] Japan .................. 1-179782

[51] Int. Cl.⁵ .............................. H05B 1/02
[52] U.S. Cl. ........................ 219/505; 219/497; 219/508; 219/492; 361/90
[58] Field of Search ............ 219/492, 494, 497, 499, 219/501, 505, 508, 485; 361/90, 91; 307/117

[56] References Cited

U.S. PATENT DOCUMENTS

| | | | |
|---|---|---|---|
| 3,878,358 | 4/1975 | Barton et al. | 219/505 |
| 4,031,352 | 6/1977 | Oosterberg | 219/505 |
| 4,736,091 | 4/1988 | Moe | 219/497 |
| 4,926,025 | 5/1990 | Wilhelm | 219/501 |
| 4,943,706 | 7/1990 | Lyall et al. | 219/505 |

*Primary Examiner*—Mark H. Paschall
*Attorney, Agent, or Firm*—Finnegan, Henderson, Farabow, Garrett, and Dunner

[57] ABSTRACT

A temperature controller wherein breakage of a thermistor whose resistance decreases with increase in temperature of a member to be heated is detected by watching whether a voltage dependent upon the resistance of the thermistor is increased or not after a predetermined period of time. A heater for heating the member is turned off when the breakage of the thermistor is detected.

2 Claims, 2 Drawing Sheets

TEMPERATURE CONTROLLER HAVING A CONTROLLER BREAKAGE DETECTOR

BACKGROUND OF THE INVENTION

1. Field of the Invention

The present invention relates to a temperature controller used for a fixing apparatus of a toner image recording apparatus. More specifically, the invention relates to a temperature controller which detects the temperature of a member to be heated as a voltage that changes depending on the resistance of a thermistor whose resistance decreases with increase in temperature, and which turns on or off a heater that heats the member that is to be heated based upon the detected voltage.

2. Description of the Prior Art

According to a conventional temperature controller like the one described above, in case the thermistor is broken, the heater is maintained turned on by the detected voltage based on the assumption that the detected voltage corresponds to a low temperature of the member to be heated, resulting in the occurrence on such accidents as scorching of the recording paper and burning of the fixing apparatus.

SUMMARY OF THE INVENTION

An object of the present invention is to provide a temperature controller which detects the breakage of the thermistor in case it happens and, hence, prevents the occurrence of accident as mentioned above.

The above object can be attained by a temperature controller which detects the temperature of a member to be heated as a voltage that changes depending upon the resistance of a thermistor whose resistance decreases with an increase in temperature to turn on or off the heater characterized by comprising a breakage detecting circuit which detects whether said voltage changes into a voltage higher than said voltage after a predetermined period of time.

According to the temperature controller of the present invention, the breakage detecting circuit detects whether the voltage corresponding to a temperature lower than a predetermined temperature changes into a voltage corresponding to a temperature higher than said predetermined temperature after a predetermined period of time to detect the breakage of the thermistor earlier than anything else. Thus, it is possible to prevent the occurrence of such a danger than the member to be heated is overheated because the heater is continuously turned on by the voltage detected from the broken thermistor. Specifically, when the thermistor is not broken, the detected voltage changes after a predetermined period of time into a low voltage that corresponds to a temperature increased. However, when the thermistor is broken, the detected voltage does not increase even after a predetermined period of time.

Other object and features of the present invention will be described below in conjunction with the accompanying drawings.

DESCRIPTION OF THE PREFERRED EMBODIMENT

Figure 1:
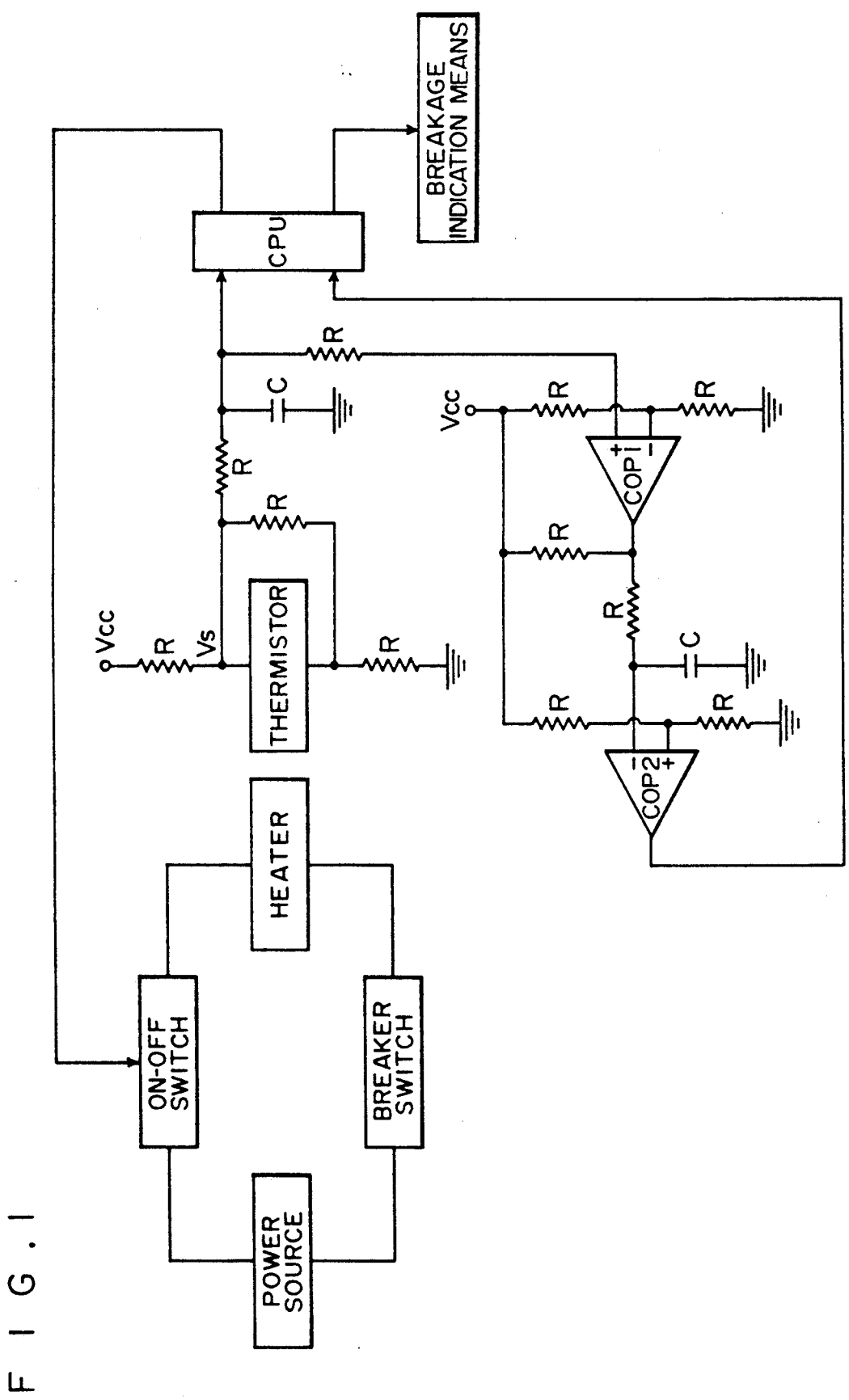
FIG. 1 is a circuit diagram illustrating a temperature controller of the present invention.

In FIG. 1, a thermistor which detects the temperature of a member to be heated in the present invention is the one whose resistance decreases with the increase in temperature.

When the temperature controller uses such a thermistor, there develops no problem of overheating due to the breakage of the thermistor.

The temperature of the member to be heated by the heater is controlled in a manner that a detected voltage Vs of the thermistor picked up with reference to a reference voltage Vcc is input to a CPU which compares the detected voltage Vs with a lower-limit voltage $V_{TL}$ that corresponds to a lower-limit temperature $T_L$ and with an upper-limit voltage $V_{TH}$ that corresponds to an upper-limit temperature $T_H(V_{TL} > V_{TH})$, wherein an on-off switch is turned on under the conditions $Vs > V_{TL}$ whereby the member to be heated by the heater is heated and when $Vs > V_{TH}$, the on-off switch is turned off. A breaker switch is a normally-on switch.

In case the thermistor is broken in the above-mentioned temperature control, the detected voltage Vs is usually $Vs > V_{TL}$, and the on-off switch remains turned on, overheating the heater and the member to be heated. In order to prevent this, the detected voltage Vs is also input to the breakage detecting circuit that includes comparators COP1, COP2, and an R-C delay circuit such that breakage in the thermistor can be quickly detected in case the breakage develops as mentioned below.

Figure 2A:
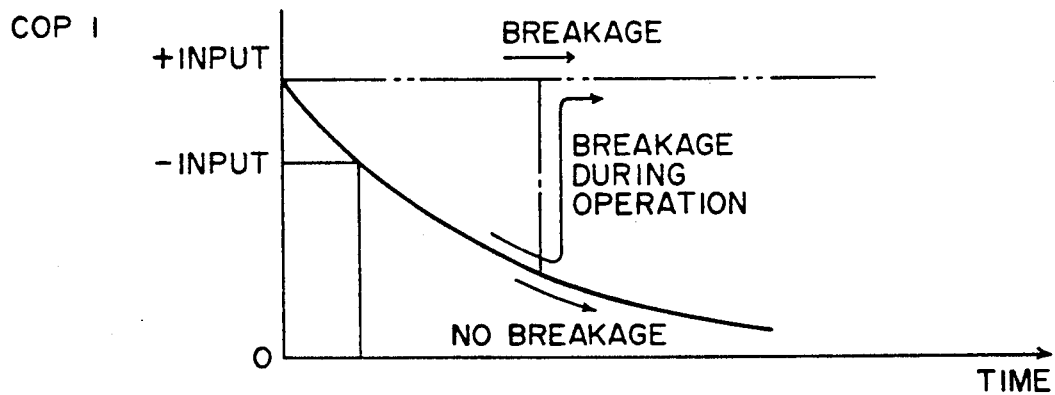
FIGS. 2(A) to 2(D) are timing charts illustrating changes of signals of a breakage detecting circuit depending upon the presence or absence of breakage of the thermistor.
Figure 2B:
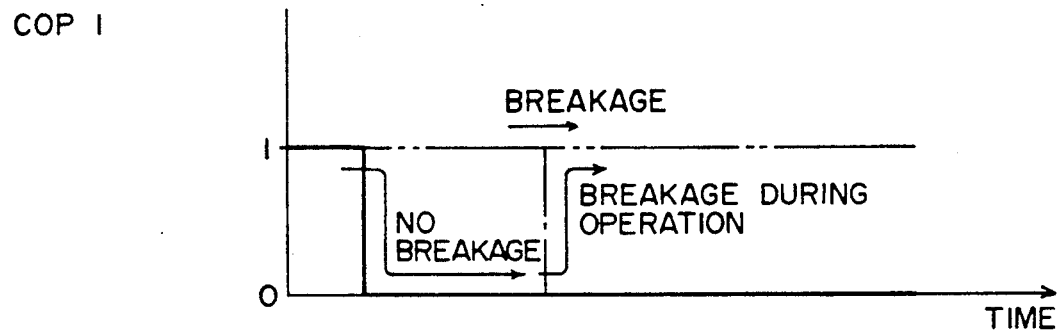
Figure 2C:
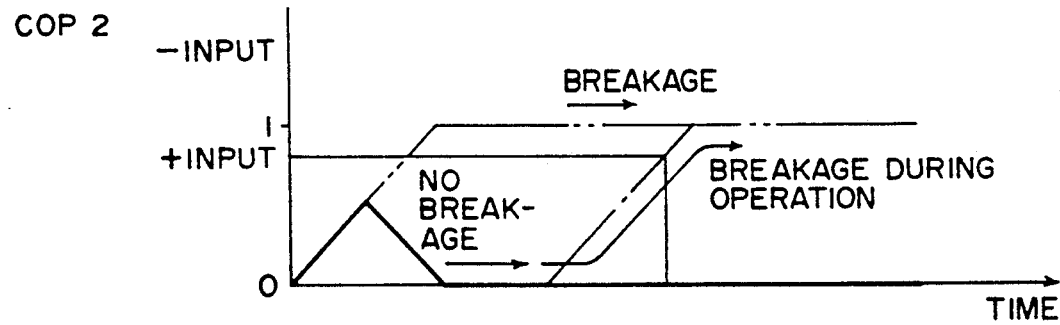
Figure 2D:
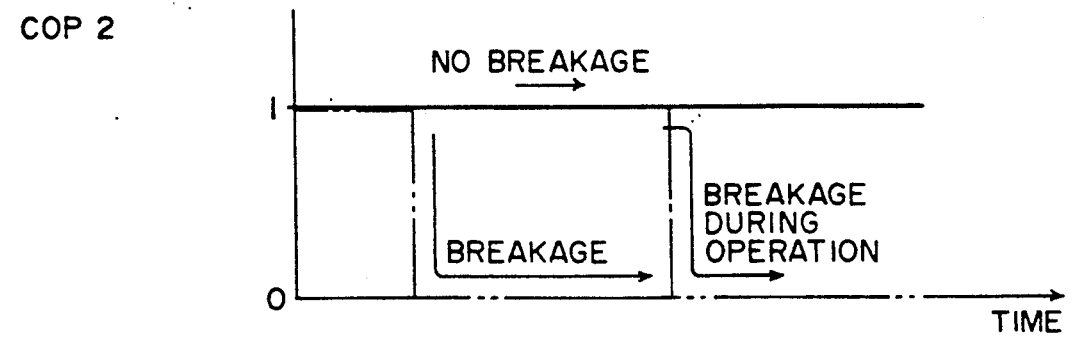

A positive input of the comparator COP1 which is based on the detected voltage Vs of the thermistor changes as shown in FIG. 2(A). The output of the COP1 which receives as a negative input a comparative voltage that is higher than the aforementioned lower-limit voltage $V_{TL}$ and that is lower than the detected voltage Vs when the thermistor is broken, changes as shown in FIG. 2(B). That is, when the thermistor has not been broken, it changes as shown by a solid line in the case of no breakage. When the thermistor has been broken already, it varies as shown by a two-dot chain line in the case of breakage. When the thermistor is broken during the operation, it changes as shown by the solid line during no breakage and varies as shown by a one-dot chain line from the time of occurrence of the breakage. The COP2 receives a negative input from the COP1 through the R-C delay circuit changes as shown in FIG. 2(C). The COP2 also receives as a positive input a comparative voltage which is higher than a voltage for charging the capacitor C in the R-C delay circuit until the output of the COP1 changes from a high-level voltage 1 into a low-level voltage 0, when the thermistor has not been broken, but is lower than the high-level voltage 1. As shown in FIG. 2(D), when the thermistor has not been broken, the output of the COP2 changes according to a solid line. When the thermistor has been broken already, it changes according to a two-dot chain line. When the thermistor is broken during the operation, it changes according to the solid line in the case of no breakage and changes according to a one-dot chain line in the case of breakage during the operation. The output of the COP2 is input to the CPU which, when the output of the COP2 has changed from the high level 1 to the low level 0, causes breakage indication means to indicate the breakage of the thermistor. If the breaker switch is turned off in response to this indication, it becomes possible to prevent the heater and the member to be heated from being overheated due to breakage of the thermistor.

According to the present invention, breakage detecting circuit needs not be limited to the illustrated embodiment so long as it is capable of detecting whether the detected voltage of the thermistor corresponding to the turn-on of the heater does not change. Moreover, the controller may be one where a breaker switch is turned off by breaker switch operation means instead of indicating the breakage by the CPU.

EFFECT OF THE INVENTION

According to the temperature controller of the present invention, any breakage of a thermistor is quickly detected by a breakage detecting circuit. It is therefore possible to prevent the occurrence of such a danger that the heater and the member to be heated are overheated due to the breakage of the thermistor.

What is claimed is:

1. An apparatus for controlling the temperature of a member by energizing or deenergizing a heater in response to the temperature of the member, the apparatus comprising:
   a thermistor for sensing the temperature of the member, the resistance of the thermistor being inversely proportional to the temperature of the member, the apparatus determining the temperature of the member by detecting a voltage which changes depending on the resistance of the thermistor;
   means for detecting whether said thermistor is broken, said means including first means for comparing said detected voltage to a first predetermined voltage and outputting a selected one of two possible values, a second means for comparing the output from said first comparing means to a second predetermined voltage and outputting a selected one of two possible values, and means for delaying the output of said first comparing means from reaching the second comparing means.

2. The apparatus of claim 1 wherein the first predetermined voltage is equal to the second predetermined voltage.

* * * * *